US012650708B2

(12) United States Patent
Lo

(10) Patent No.: US 12,650,708 B2
(45) Date of Patent: Jun. 9, 2026

(54) FOLDABLE SCREEN MESH IMPRINTS PREVENTION

(71) Applicant: Google LLC, Mountain View, CA (US)

(72) Inventor: Chu-Chun Lo, New Taipei City (TW)

(73) Assignee: Google LLC, Mountain View, CA (US)

( * ) Notice: Subject to any disclaimer, the term of this patent is extended or adjusted under 35 U.S.C. 154(b) by 194 days.

(21) Appl. No.: 18/639,458

(22) Filed: Apr. 18, 2024

(65) Prior Publication Data

US 2025/0328163 A1     Oct. 23, 2025

(51) Int. Cl.
G06F 1/16          (2006.01)

(52) U.S. Cl.
CPC .......... G06F 1/1616 (2013.01); G06F 1/1652 (2013.01); G06F 1/1656 (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 10,795,415 | B2 * | 10/2020 | Cavallaro | ............. | G06F 1/1652 |
| 11,557,740 | B2 * | 1/2023 | An | ......................... | H10K 59/12 |
| 11,800,652 | B2 * | 10/2023 | Shin | .......................... | B32B 7/14 |
| 12,001,243 | B2 * | 6/2024 | Kim | ..................... | C09K 3/1481 |
| 12,346,167 | B2 * | 7/2025 | Shin | ........................ | B32B 3/085 |
| 2014/0253826 | A1 | 9/2014 | He | | |
| 2020/0241594 | A1 * | 7/2020 | Cavallaro | ................. | B32B 7/12 |
| 2021/0249614 | A1 * | 8/2021 | An | ..................... | H10K 59/8722 |
| 2022/0129040 | A1 * | 4/2022 | Kim | ...................... | G06F 1/1652 |
| 2022/0336772 | A1 * | 10/2022 | Choi | ..................... | G06F 1/1656 |
| 2023/0017674 | A1 | 1/2023 | Kim et al. | | |
| 2023/0080858 | A1 * | 3/2023 | Lee | ........................ | G06F 1/1641 |
| | | | | | 361/807 |
| 2024/0015894 | A1 * | 1/2024 | Shin | .......................... | B32B 7/02 |
| 2024/0295904 | A1 * | 9/2024 | Kim | ...................... | G09F 9/301 |
| 2025/0291386 | A1 * | 9/2025 | Shin | ...................... | G06F 1/1652 |
| 2025/0328163 | A1 * | 10/2025 | Lo | .......................... | G06F 1/1656 |

FOREIGN PATENT DOCUMENTS

| | | |
|---|---|---|
| CN | 219497258 U | 8/2023 |
| KR | 20230010076 A | 1/2023 |
| TW | 201930523 A | 8/2019 |
| WO | 2024001336 A1 | 1/2024 |

* cited by examiner

*Primary Examiner* — Lisa Lea-Edmonds
(74) *Attorney, Agent, or Firm* — Shumaker & Sieffert, P.A.

(57)          ABSTRACT

An example foldable display includes a continuous display that includes a flexible segment configured to fold, wherein the continuous display includes: a display layer comprising an optical display; a support layer underlying the display layer; a barrier layer underlying the support layer; and an adhesive layer adhering the barrier layer to the support layer, wherein at least a portion of the adhesive layer includes a plurality of adhesive elements arranged in a grid having spaces there between.

19 Claims, 6 Drawing Sheets

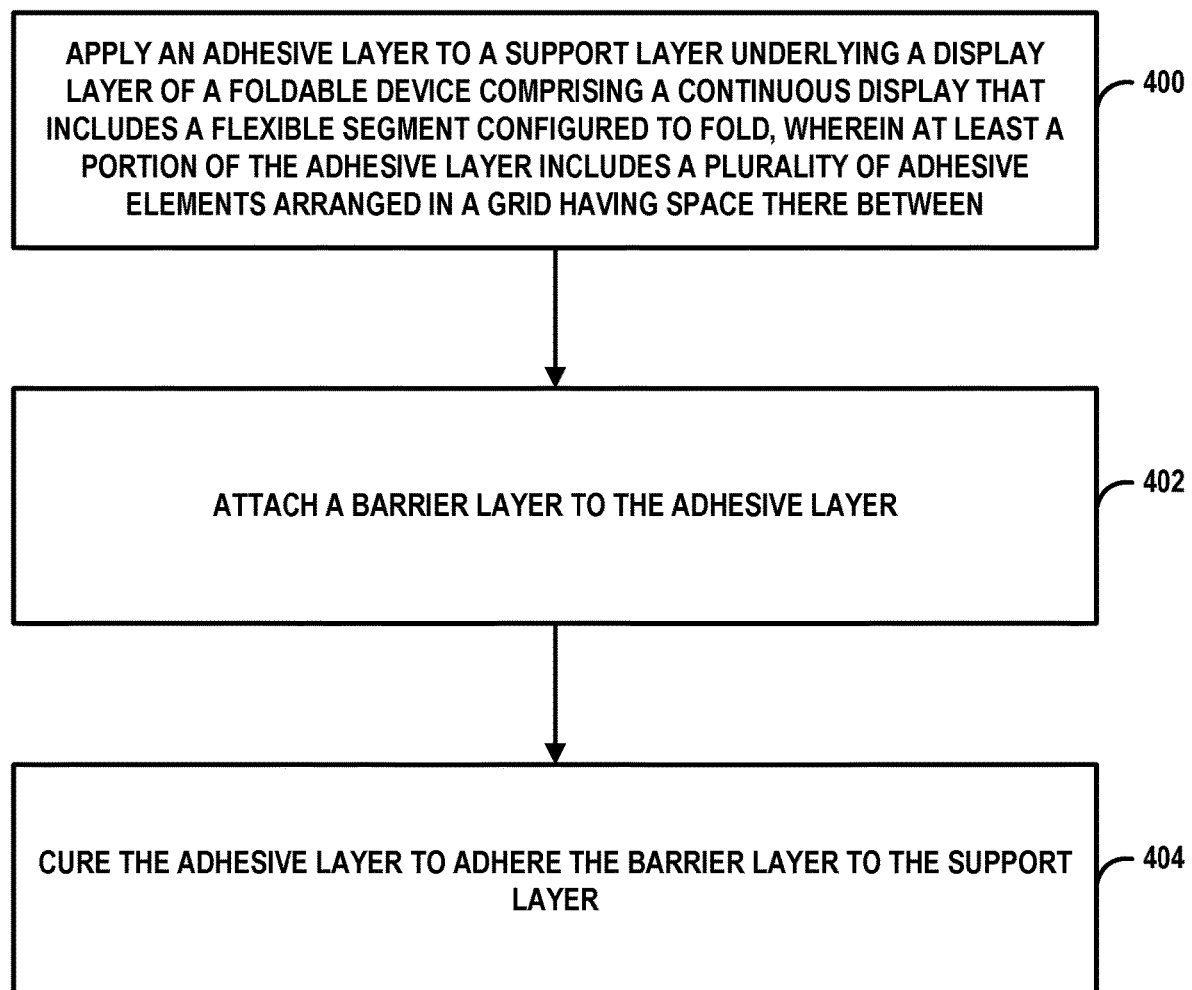

APPLY AN ADHESIVE LAYER TO A SUPPORT LAYER UNDERLYING A DISPLAY LAYER OF A FOLDABLE DEVICE COMPRISING A CONTINUOUS DISPLAY THAT INCLUDES A FLEXIBLE SEGMENT CONFIGURED TO FOLD, WHEREIN AT LEAST A PORTION OF THE ADHESIVE LAYER INCLUDES A PLURALITY OF ADHESIVE ELEMENTS ARRANGED IN A GRID HAVING SPACE THERE BETWEEN — 400

ATTACH A BARRIER LAYER TO THE ADHESIVE LAYER — 402

CURE THE ADHESIVE LAYER TO ADHERE THE BARRIER LAYER TO THE SUPPORT LAYER — 404

FIG. 4

FOLDABLE SCREEN MESH IMPRINTS PREVENTION

BACKGROUND

Devices that include displays may be referred to as display devices. In general, it may be desirable to increase the size of a display (e.g., the area on which images are displayed) as much as possible. One way to increase the size of a display without negatively affecting the portability of the device is to make the device collapsible such that the display can be folded (e.g., in half). Assembly of such a device with a foldable display may include adhering one or more layers together to form the foldable display.

SUMMARY

Computing devices with foldable displays may include foldable displays that are assembled by adhering multiple layers together. Foldable displays may be assembled by adhering layers such as a display layer (which may contain one or more components such as a display panel, a polarizer layer, and other components) to other layers using adhesives. For example, a foldable display may include a support layer that provides support to the foldable display and a barrier layer that provides protection against dust and water intrusion. Traditional techniques of foldable display design and assembly may result in a continuous layer of adhesive causing deforming during the curing process (e.g., when heated in an autoclave). For example, the use of a continuous layer of adhesive may result in deformation of the foldable display during an assembly process due to an inability to equalize pressure between the interior and exterior of the foldable display. In addition, the use of an adhesive layer with a gap over a foldable region may result in reduced deformation but reduce the mechanical robustness of the display.

In accordance with one or more aspects of this disclosure, a foldable display may include an adhesive layer that adheres a barrier layer to a support layer, where the adhesive layer includes a plurality of adhesive elements arranged in a grid having spaces there between. For instance, the adhesive elements of the adhesive layer may be arranged in an interlaced pattern that allows for air to pass among the adhesive elements and to exchange with air exterior to the foldable display. The adhesive elements may enable a foldable display to retain mechanical robustness while preserving the aesthetics of the foldable display.

In one example, a foldable display comprises a continuous display that includes a flexible segment configured to fold, wherein the continuous display comprises: a display layer comprising an optical display; a support layer underlying the display layer; a barrier layer underlying the support layer; and an adhesive layer adhering the barrier layer to the support layer, wherein at least a portion of the adhesive layer includes a plurality of adhesive elements arranged in a grid having spaces there between.

In another example, a method includes applying an adhesive layer to a support layer underlying a display layer of a foldable display comprising a continuous display that includes a flexible segment configured to fold, wherein at least a portion of the adhesive layer includes a plurality of adhesive elements arranged in a grid having space there between; attaching a barrier layer to the adhesive layer; and curing the adhesive layer to adhere the barrier layer to the support layer.

In yet another example, a kit for adhering a barrier layer to a support layer of a foldable display, the kit comprising: a display layer comprising an optical display; the support layer underlying the display layer; the barrier layer underlying the support layer; and the adhesive layer adhering the barrier layer to the support layer, wherein at least a portion of the adhesive layer includes a plurality of adhesive elements arranged in a grid having spaces there between.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 4 is a flow chart illustrating a method of assembling a folding device, in accordance with one or more aspects of this disclosure.

DETAILED DESCRIPTION

Figure 1:
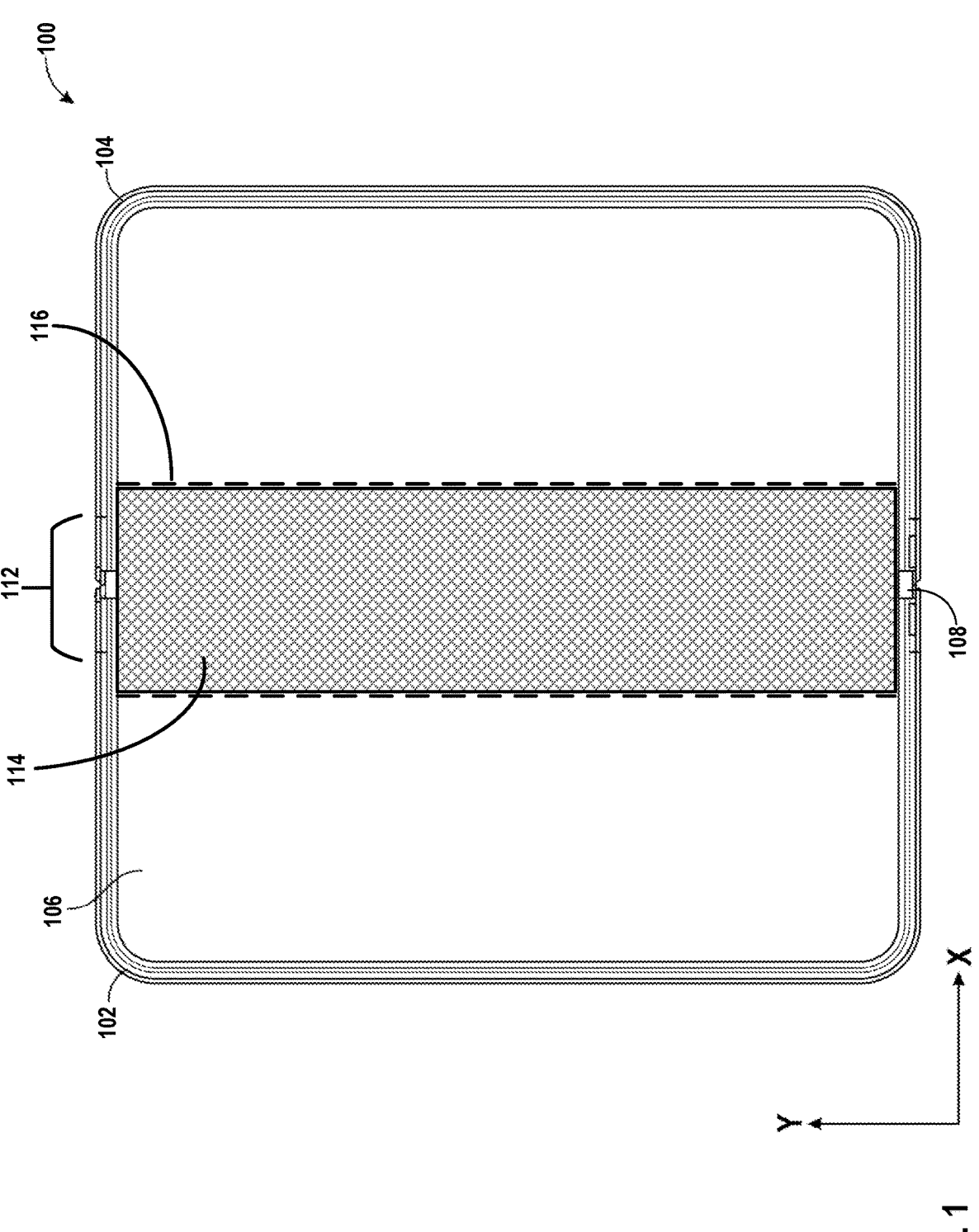
FIG. 1 is a schematic diagram illustrating a folding device with a folding continuous display, in accordance with one or more aspects of this disclosure.

FIG. 1 is schematic diagrams illustrating a folding device 100 with a folding continuous display 106, in accordance with one or more aspects of this disclosure. Examples of folding device 100 include foldable computing devices such as foldable smart phones, foldable tablets, foldable e-readers, foldable gaming systems, or any other foldable portable device.

As shown in FIG. 1, folding device 100 includes a first assembly 102, second assembly 104, continuous display 106, and hinge 108 connecting first assembly 102 and second assembly 104. First assembly 102 and second assembly 104 may be rotatably connected to hinge 108. Each of first assembly 102 and second assembly 104 may include an inner surface and an outer surface. The outer surface of first assembly 102 may be visible when looking up at folding device 100 in the z-axis and the outer surface of second assembly 104 may be visible when looking up at device 100 in the z-axis. The inner surfaces of first assembly 102 and second assembly 104 may not be externally visible when folding device 100 is closed. As further shown in FIG. 1, when folding device 100 is fully open, an inner surface of a first assembly 102 is coplanar with an inner surface of a second assembly 104.

Folding device 100 may include a continuous display 106 that spans at least a portion of the interior of folding device 1100. Continuous display 106 may be a display that is capable of rendering data into images viewable by a user of device 100. For example, continuous display 106 may include a matrix of pixels that are individually controllable. Examples of continuous display 106 include, but are not limited to, displays having emitting/emissive elements such as light emitting diode (LED) displays, organic light-emitting diode (OLED) displays, micro light-emitting diode (microLED) displays, electronic ink (e-ink) displays, or similar monochrome or color displays capable of outputting visible information to a user of device 100. Continuous display 106 may be flexible and capable of being shaped without damage to the display. In addition, continuous display may span both first assembly 102 and second assembly 104 across hinge 108. For instance, continuous display 106 may cover a majority of the inner surfaces of first assembly 102 and second assembly 104.

In some examples, folding device 100 may include one or more displays in addition to continuous display 106. For instance, device 100 may include a first additional display on the outer surface of first assembly 102. In some examples, folding device 100 may further include a second additional display on the outer surface of second assembly 104.

Continuous display 106 may include a support layer between the display panel of continuous display 106 and the interior of folding device 100 (e.g., located beneath the panel of continuous display 106 when looking down at folding device 100 in the z-axis). Continuous display 106 may include a support layer that is adhered or otherwise bonded to a display component (e.g., a flexible display panel) of continuous display 106. The support layer of continuous display 106 may provide support and mechanical robustness to continuous display 106 as continuous display 106 may require added reinforcement/support due to the flexible nature of the display.

Foldable device 100 includes flexible region 112. Flexible region 112 may be a region of continuous display 106 that bends and otherwise changes shape to enable foldable device 100 to open and close. For example, flexible region 112 may include a portion of continuous display 106 that changes from a planar shape to a curved shape when foldable device 100 is closed. The region of the support layer corresponding to flexible region 112 may include a mesh or otherwise discontinuous layer to enable continuous display to flex and change shape in flexible region 112 (e.g., the support layer may include one or more solid sections outside of flexible region 112 connected to a mesh that crosses flexible region 112). Flexible region 112 may bend or otherwise change shape along an axis consistent with hinge 108.

Device 100 may include a mechanical hinge such as hinge 108 that rotatably connects first assembly 102 and second assembly 104. Hinge 108 may include one or more mechanical components such as mechanical moving joints. Hinge 108 may enable first assembly 102 and second assembly 104 to rotate towards each other and terminate in a closed position of foldable device 100. For example, when foldable device 100 is being adjusted from a closed position to an open position, hinge 108 may facilitate the adjustment of the position of foldable device 100 and the positions of first assembly 102 and second assembly 104 relative to each other. Continuous display 106 may overlay (looking down at foldable device 100 along the z-axis) hinge 108.

Continuous display 106 may include barrier layer 116 that underlies (looking down at foldable device 100 along the z-axis) continuous display 106 and is above the exterior surface of first assembly 102 and second assembly 104. Barrier layer 116 may be one or more flexible materials such as different types of plastics. For example, barrier layer 116 may be a sheet of thermoplastic polyurethane (TPU). Barrier layer 116 may provide protection against water intrusion and dust intrusion into continuous display 106, for example along flexible region 112 of continuous display 106. As flexible region 112 may include a mesh instead of a continuous plate or sheet of support material, flexible region 112 may present an area where liquids and dust may enter into continuous display 106 without any sort of barrier such as barrier layer 116. Barrier layer 116 may provide such a barrier against water and dust intrusion into continuous display 106 along flexible region 112.

Foldable device 100 may include adhesive layer 114. Adhesive layer 114 may be a layer of adhesive material located between barrier layer 116 and the support layer of continuous display 106 that extends to an entirety or a portion of continuous display 106. For example, adhesive layer 114 may extend to cover only the portion of the support layer consistent with barrier layer 116. Adhesive layer 114 may include one or more types of adhesives such as rubber, silicone, and/or acrylic adhesives. In some examples, adhesive layer 114 may include pressure-sensitive adhesive (PSA). Adhesive layer 114 may adhere barrier layer 114 to the support layer of continuous display 106. Continuous display 106 may include additional layers of adhesive such as a layer of adhesive between the support layer and a display panel.

The layers of continuous display 106 (e.g., the display panel, the support layer, adhesive layer 114, barrier 116 layer, etc.) may be assembled together to form continuous display 106. The layers of continuous display 106 may be assembled together using an autoclave or other assembly device capable of applying heat and/or pressure to adhere the layers of continuous display 106 together. For example, an autoclave may apply heat and pressure (e.g., 0.2-0.6 MPa, 40-60° C.) to adhere the layers of continuous display 106 together. In addition, the autoclave may apply the heat and pressure to defoam continuous display 106 (e.g., remove bubbles and air gaps within continuous display 106 resulting from an initial assembly of continuous display 106).

Continuous display 106, when the display panel and the support panel are adhered together in an autoclave using continuous sheets of adhesive and/or a sheet of adhesive with a gap in the region of flexible region 112, may result in aesthetic deficiencies and/or reduced mechanical robustness of continuous display 106. When continuous display 106 includes a continuous layer of adhesive between the support layer and the display layer, the pressure applied by the autoclave during the assembly process may result in deformation of continuous display 106 in flexible region 112 due to the pressure differential between the interior of continuous display 106 and the autoclave (e.g., as the interior continuous display 106 is airtight due to the continuous layer of adhesive). For example, continuous display 106 may include an imprint of the mesh of the support layer in the top of continuous display (e.g., when looking down at device 100). Alternatively, when continuous display 106 includes a gap in an adhesive layer between the display panel and the support layer, continuous display 106 may have a comparatively more pleasing aesthetic appearance but have reduced mechanical robustness due to the gap in the adhesives adhering the display panel to the support layer (e.g., due to the display panel directly resting on or floating above the mesh of the support layer without an intermediate layer of adhesives).

In accordance with one or more aspects of this disclosure, adhesive layer 114 may include a plurality of adhesive elements arranged in a grid having spaces there between. Rather than including a continuous sheet of adhesive adhering barrier layer 116 to the support layer, adhesive layer 114 may include adhesive elements arranged in a grid according to one or more patterns such as an interlaced pattern. The adhesive elements of adhesive layer 114 may enable air to escape from between barrier layer 116 and the support layer during an assembly of continuous display 106. For example, the adhesive elements and the space between them may enable the internal air pressure of continuous display 106 to equalize with the air pressure of an autoclave during the assembly of continuous display 106, prevent deformation of continuous display 106, and/or maintain the aesthetic appearance of continuous display 106. In addition, the adhesive elements of adhesive layer 116 may enable the placement of adhesives across flexible region 112 between the display panel and the support layer while avoiding the aesthetic issues caused by deformation of continuous display while in a curing chamber (e.g., an autoclave).

Adhesive layer 114 may include a plurality of adhesive elements. Adhesive layer 114 may include adhesive elements in various shapes such as triangles, squares, rectangles, pentagons, and hexagons among other shapes. The adhesive elements of adhesive layer 114 may include one or more types of adhesives such as rubber, plastic, and acrylic adhesives among other types of adhesives. Adhesive layer 114 may be applied to continuous display 106 during an assembly process by one or more devices such as a roller applying a sheet of adhesive elements to continuous display 106. For instance, a roller may include a sheet of adhesive elements spaced between themselves that the roller "rolls" onto continuous display 106.

The designs of this disclosure provide one or more technical advantages. For example, instead of requiring a designer of foldable device to choose between having a continuous layer of adhesive between the display panel and the support layer of continuous display 106 (and therefore risk aesthetic issues developing during the curing process) and having no layer of adhesive in flexible region 112 (and therefore potentially reduce the mechanical robustness of continuous display), the adhesive elements of adhesive layer 114 enable the use of a continuous layer of adhesive between the display panel and the support layer without aesthetic issues. Further, the use of adhesive elements in adhesive 114 may enable the internal air pressure of continuous display 106 to equalize with the pressure of an autoclave while still sufficiently adhering barrier layer 116 to the support layer for barrier layer 116 to provide protection against dust and water intrusion into continuous display 106.

Figure 2A:
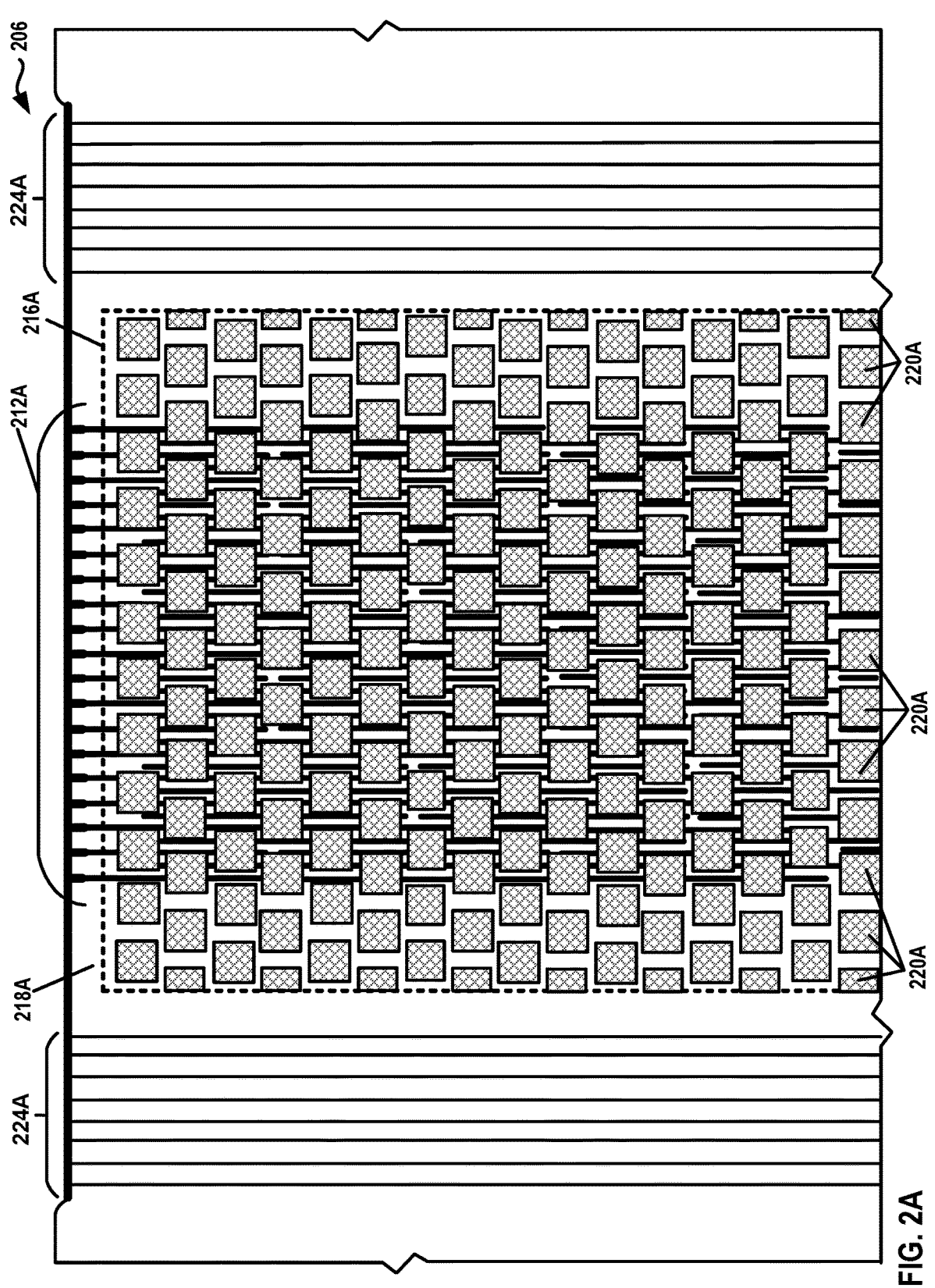
FIGS. 2A and 2B are schematic diagrams illustrating a folding continuous display with adhesive elements arranged in a grid, in accordance with one or more aspects of this disclosure.
Figure 2B:
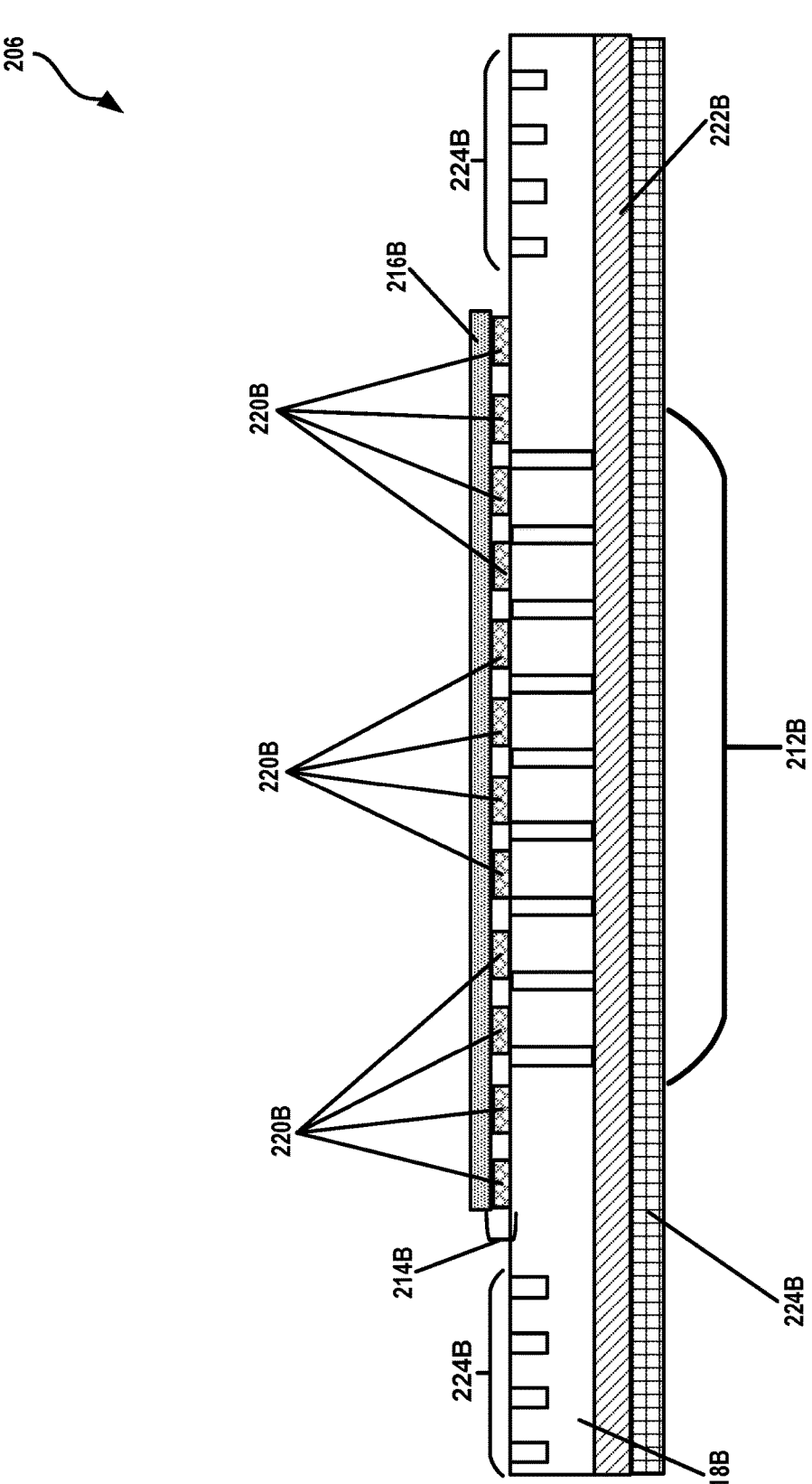

FIGS. 2A and 2B are schematic diagrams illustrating a folding continuous display 206 with adhesive elements arranged in a grid, in accordance with one or more aspects of this disclosure. FIG. 2A may be an underneath perspective of continuous display 206 from an opposing view compared to folding device 100 as illustrated in FIG. 1 (e.g., looking up the z-axis at folding device 100 instead of looking down the z-axis at folding device 100 as in FIG. 1). In addition, continuous display 206 may be similar to continuous display 106 as illustrated in FIG. 1 and provide similar functionality.

Continuous display 206 may include one or more layers (with some not illustrated in FIG. 2A). Continuous display 206 may include a display layer (e.g., a layer that includes a flexible display panel, a polarizer panel, one or more layers of adhesive such as optically clear adhesive, and other components related to the display panel), a support layer 218A (e.g., a layer that provides structural support and mechanical robustness to the display layer), barrier layer 216A, and one or more adhesive layers (e.g., an adhesive layer adhering the display layer to the support layer, an adhesive layer adhering barrier layer 216A to support layer 218A, etc.).

Support layer 218A may be a layer of continuous display 206 that provides structural support and mechanical robustness for continuous display 206. Support layer 218A may include one or more materials such as metals, plastics, and rubber among other materials. Support layer 218A may include one or more planar sheets of material that underlie (looking down the z-axis) the display layer of continuous display 206. For example, support layer 218A may include a planar sheet of material in first assembly 102 as illustrated in FIG. 1 and another planar sheet of material in second assembly 104 as illustrated in FIG. 1.

Support layer 218A may include one or more flexible and/or discontinuous sections. Support layer 218A may include flexible sections made of a mesh that enable continuous display 206 to flex. For example, support layer 218 may include two or more planar sheets of material connected via the mesh, where the mesh corresponds to a flexible region of continuous display 206. Support layer 218A may include a mesh in a flexible region such as first folding region 212A.

Continuous display 206 may include one or more regions that enable continuous display 206 to flex and change shape and enable continuous display to fold. Continuous display 206 may include first folding region 212A and second folding region 224A. Continuous display 206 may flex and change shape in the regions of first folding region 212A and second folding region 224A. For example, continuous display 206 may flex in the regions of first folding region 212A and second folding region 224A and enable the folding device to open and close. First folding region 212A and second folding region 224A may correspond to a section of support layer 218A that includes a mesh. For example, first folding region 212A may correspond to a section of mesh of support layer 218A that enables continuous display 206 to flex.

Continuous display 206 may include a barrier layer 216A. Continuous display 206 may include barrier layer 216A to provide protection against water and dust intrusion in first folding region 212A. As the portion of support layer 218A corresponding to first folding region 212A may include a mesh instead of a continuous sheet of material, continuous display 206 may be exposed to the intrusion of foreign materials and liquids without the presence of a barrier such as barrier layer 216A Barrier layer 216A may include a layer of one or more materials such as TPU underlying the entirety or a portion of support layer 218A of continuous display 206 (e.g., between support layer 218A and the exterior of continuous display 206. Barrier layer 216A may provide protection against dust and water intrusion in the region of first folding region 212A. Barrier layer 216A may be an impermeable barrier between an exterior of continuous display 206 and support layer 218A.

Continuous display 206 may include a layer of adhesives that adhere barrier layer 216A and support layer 218A together. Continuous display 206 may include a layer of adhesive to secure barrier layer 216A to support layer 218A and ensure that barrier layer 216A remains attached to support layer 218A. For example, continuous display 206 may include a sheet of adhesives that secure barrier layer 216A and support layer 216A and that are cured during a curing process of continuous display 206.

The layer of adhesive adhering barrier layer 216A and support layer 218A may include a plurality of adhesive elements 220A. Adhesive elements 220A may include a plurality of rectangularly shaped pieces of adhesives arranged in one or more patterns of a grid. Each adhesive element of adhesive element 220A may be between a range of thicknesses in width. For example, each adhesive element of adhesive elements 220A may be between 0.7 millimeters and 1.2 millimeters in width along a direction perpendicular to a planar surface of the foldable display in an unfolded state (e.g., the surface of continuous display 206). In addition, adhesive elements 220A may be arranged in one or more patterns such as an interlaced pattern, offset pattern, or other type of pattern. As part of a pattern, adhesive elements 220A may be arranged with spacing between each adhesive element. Adhesive elements 220A may be arranged such that each adhesive element is spaced between a range of spacing between 0.03 millimeters and 0.25 millimeters from the edge of another respective adhesive element of adhesive elements 220A. For example, each adhesive element of adhesive elements 220A may be spaced between 0.05 millimeters and 0.2 millimeters from another adhesive element of the plurality of adhesive elements 220A.

In some examples, adhesive elements 220A may be arranged in a pattern where the spacing between each adhesive element of adhesive elements 220A is varied based on the relative location of a given adhesive element (e.g., reduced spacing near the edges of the layer of adhesive elements 220A, greater spacing between adhesive elements 220A in some sections of the layer of adhesive elements 220A, etc.) Adhesive elements 220A may adhere together one or more components of continuous display 206 during a curing process.

The assembly process of continuous display 206 may include a curing process. The assembly process of continuous 206 may include applying heat and/or pressure to continuous display 206 to cure one or more adhesive layers of continuous display 206 and adhere the layers of continuous 206 together. For example, an autoclave may apply a combination of heat and pressure to continuous display 206 to cause the adhesives of continuous display 206 to cure and adhere the layers of continuous display 206 together.

Adhesive elements 220A may enable the equalization of pressure within continuous display 206 during a curing process. Due to the spacing between each adhesive element 220A of the plurality of adhesive elements 220A, adhesive elements 220A may enable air and other gasses to escape and/or enter the interior of continuous display 206 and therefore equalize the pressure between continuous display 206 and the exterior of continuous display 206. In an example, an autoclave increases the pressure and temperature of air external to continuous display 206 during a curing process of continuous display 206. Adhesive elements 220A enable air to enter the interior of continuous display 206 and therefore equalize the pressure between the interior of continuous display 206 and the exterior of continuous display 206. Adhesive elements 220A may enable the equalization of air pressure and therefore prevent the deformation of continuous display during the assembly process. For example, without adhesive elements 220A enabling the equalization of air pressure, one or more layers of continuous display 206 may deform during a curing process due to the comparatively higher external air pressure. In addition, adhesive elements 220A may enable the use of a continuous layer of adhesive between a display layer and support layer 218A while preventing deformation of continuous display 206 (e.g., by allowing air to enter continuous display 206 that would normally be prevented by the continuous layer of adhesive).

FIG. 2B illustrates a schematic view of continuous display 206 from a perspective consistent with the y-axis of folding device 100 as illustrated in FIG. 1. As shown in FIG. 2B, continuous display 206 includes display layer 224B adhesive layer 222B, and adhesive element layer 214B.

Display layer 224B may include one or more components of a display of continuous display 206. Display layer 224B may include components such as a display panel (e.g., a flexible display panel), a polarizer layer, one or more protection layers (e.g., a layer between the display panel and the polarizer layer, one or more layers of tempered glass, and one or more layers of adhesive adhering the components of display layer 224B together (e.g., one or more layers of optically clear adhesive).

Display layer 224 may be adhered to support layer 218B by adhesive layer 222B. Adhesive layer 222B may be a layer of adhesive located between support layer 218B and display layer 224B. Adhesive layer 222B may include one or more types of adhesives such as plastic, rubber, and/or acrylic adhesive. Adhesive layer 222B may be a continuous sheet of adhesive adhering display layer 224B to support layer 218B. Adhesive layer 222B may extend to the edges of display layer 224B and include the region of display layer 224B consistent with first folding region 212B. Adhesive layer 222B may include first folding region 212B to provide support and mechanical robustness for display layer 224B. For example, adhesive layer 222B may provide support and mechanical robustness by providing an additional layer of material in first folding region 212B and prevent display layer 224B from "floating" (e.g., crossing first folding region 212B with no support material between display layer 224B and support layer 218B) above support layer 218B in first folding region 212B.

Continuous display 206 may include adhesive element layer 214B that includes a plurality of adhesive elements 220B. Adhesive element layer 214B may be disposed between and adhere together barrier layer 216B and support layer 218B. Adhesive element layer 214B may include a plurality of adhesive elements 220B. In some examples, adhesive element layer 214B may include a combination of adhesive elements 220B and one or more sheets of adhesive (e.g., one or more sheets of adhesive above and/or below adhesive elements 220B, one or more sheets of adhesive replacing a portion of adhesive elements 220B between barrier layer 216B and support layer 218B, etc.).

Adhesive elements 220B may be similar to adhesive elements 220A. Adhesive elements 220B may include adhesive elements with similar shape and dimensions as adhesive elements 220A. For example, each adhesive element of adhesive elements 220B may be between 0.7 millimeters and 1.2 millimeters in width along a direction perpendicular to a planar surface of the foldable display in an unfolded state. Adhesive elements 220B may be rectangularly shaped.

Adhesive elements 220B may be applied to continuous display 206 during an assembly process of continuous display 206. Adhesive elements 220B may be supplied to an assembler as part of a kit for adhering barrier layer 216B to support layer 218B of continuous display 206. The kit for adhering barrier layer may include display layer 224B, adhesive layer 222B, support layer 218B, adhesive element layer 214B, and barrier layer 216B, with at least a portion of adhesive element layer 214B including a plurality of adhesive elements 220B arranged in a grid having spaces there between. Adhesive elements 220B of adhesive element layer 214B may be applied to support layer 218B by a roller. For example, a roller may include a sheet of adhesive elements 220B and apply adhesive elements 220B to support layer 218B by rolling over and applying pressure to support layer 218B. In some examples, other types of assembly equipment may be used to apply adhesive element layer 214B to support layer 218B.

Figure 3A:
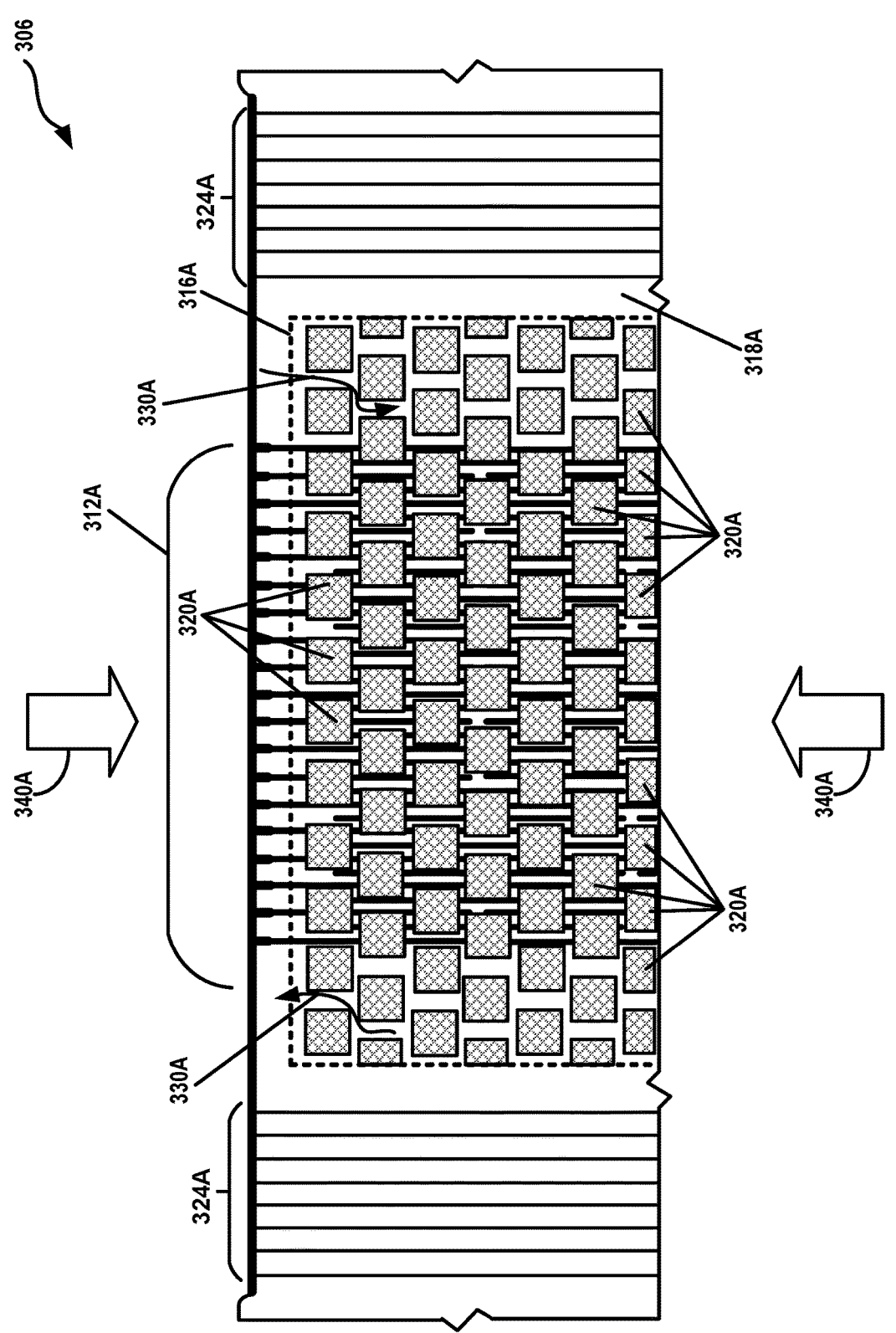
FIGS. 3A and 3B are schematic diagrams illustrating a folding continuous display with adhesive elements during an assembly process, in accordance with one or more aspects of this disclosure.
Figure 3B:
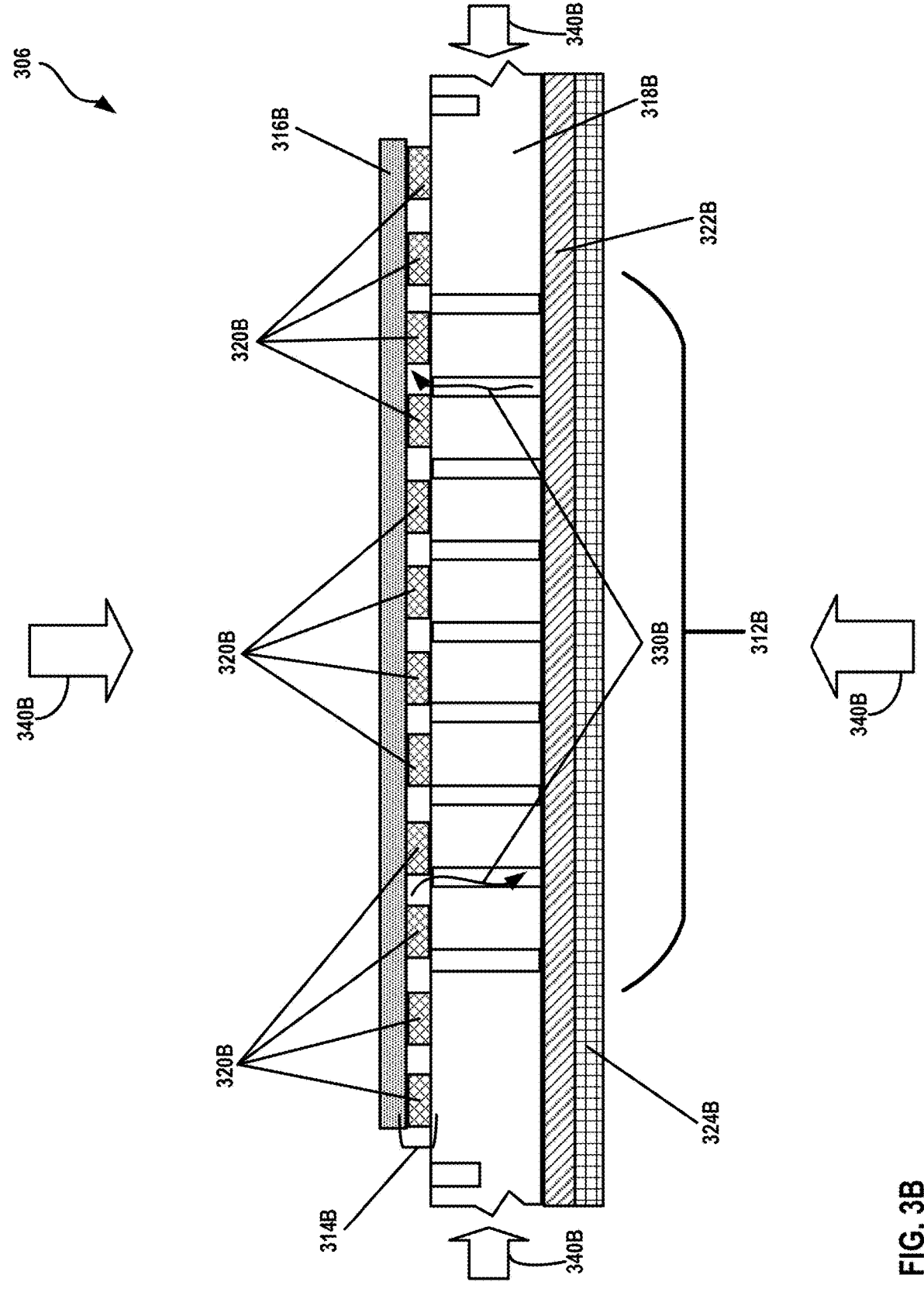

FIGS. 3A and 3B are schematic diagrams illustrating a folding continuous 306 with adhesive elements 320 during an assembly process, in accordance with one or more aspects of this disclosure. FIG. 3A may be an underneath perspective of continuous display 306 from an opposing view compared to the view of folding device 100 as illustrated in FIG. 1 (e.g., looking up the z-axis at folding device 100 instead of looking down the z-axis at folding device 100). Continuous display 306 may be similar to continuous display 106 as illustrated in FIG. 1 and/or continuous display 206 as illustrated in FIGS. 2A-2B.

Continuous display 306 may include one or more regions that enable continuous display 306 to change shape and fold. For example, continuous display 306 may include first folding region 312A and second folding region 324A. Continuous display 306 may change shape along first folding region 312A and second folding region 324A to enable a folding device that includes continuous display 306 to open and close.

Continuous display 306 may include one or more layers. Continuous display 306 includes support layer 318A, barrier layer 316A, and adhesive elements 320A. Continuous display 306 may include a layer of adhesive elements 320A arranged in a pattern and adhering barrier layer 316A to support layer 318A. For example, continuous display 306 may include barrier layer 316A and adhesive elements 320A adhered in a region consistent with first folding region 312A.

The assembly of the layers into continuous display 306 may include one or more steps and/processes. The assembly of continuous display 306 may include adhering one or more layers of continuous display 306 together. In an example, a roller applies a layer of adhesive elements 320A to support layer 318A. An assembler applies barrier layer 316A to the layer of adhesive elements 320A.

The assembly of continuous display 306 may include a curing step and/or process. The assembly of continuous may include the curing process to secure the one or more layers of continuous display 306 together. The curing process may cause the adhesives of continuous display 306 to cure and secure the layers of continuous display 306 together. In addition, the curing step may remove unwanted air pockets and distortions in continuous display 306. For example, the curing process may press a together one or more layers of the display of continuous display 306 together to remove pockets of air that may be present to the due the assembly of various layers of continuous display 306 (e.g., pockets of air resulting from the application of optically clear adhesive to a display panel.

The curing process of continuous display 306 may include applying heat and pressure via an assembly machine (illustrated via assembly arrows 340A). The assembly machine (e.g., an autoclave) may apply heat such as temperatures between 50° C. and 70° C. and pressures such as pressure between 0.15 MPa and 0.7 MPa. The autoclave may apply the heat and pressure for a predetermined period of time such as between 20 minutes and an hour.

Adhesive elements 320A may enable the equalization of air pressure between the interior of continuous display 306 and the exterior of continuous display 306 during an assembly of continuous display 306. Due to the spaces between each adhesive element of adhesive elements 320A, adhesive elements 320A may enable the air pressure to equalize between the interior of continuous display 306 and the exterior of continuous display 306. As illustrated by airflows 330A, adhesive elements 320A may enable air to move within continuous display 306 and to enter/leave the interior of continuous display 306 via the spaces between adhesive elements 320A. Adhesive elements 320A may define a path that allows for air pressure to equalize between the interior and the exterior of continuous display 306.

FIG. 3B illustrates a schematic view of continuous display 306 from a perspective consistent with the y-axis of folding device 100 as illustrated in FIG. 1 (e.g., similar to the view of continuous display 206 as illustrated in FIG. 2B). FIG. 3B may illustrate the same continuous display 306 as illustrated in FIG. 3A but from a different viewing perspective. As shown in FIG. 3B, continuous display 306 includes display layer 324B, adhesive layer 318B, and adhesive element layer 314B.

Display layer 324B may include one or more components of a display of continuous display 306. Display layer 324B may be similar to display layer 224B, provide similar functionality, and include similar components. For instance, display layer 324B may include components such as a display panel, a polarizer layer, protection layers, and other components.

Display layer 324B may be adhered to support layer 318B by adhesive layer 322B. Adhesive layer 322B may be a layer of adhesive located between support layer 318B and display layer 324B. Adhesive layer 322B may be similar to adhesive layer 222B. For example, adhesive layer 322B may be a continuous sheet of adhesive that adheres display layer 324B to support layer 318B and that extends to the edges of display layer 324B.

Continuous display 306 may include first folding region 312B. First folding region 312B may be similar to first folding region 112 as illustrated in FIG. 1, first folding region 212A as illustrated in FIG. 2A, and/or first folding region 212B as illustrated in FIG. 2B. Continuous display 306 may change shape and fold along first folding region 312B. In addition, first folding region 312B may correspond to a flexible region of support layer 318B.

Support layer 318B may include a flexible region that includes a mesh that corresponds to first folding region 312B. Support layer 318B may include the mesh to enable continuous display 306 to change shape and enable the folding of continuous display 306. In some examples, the mesh of support layer 318B may be open on either side of the mesh (e.g., allowing air to pass through the mesh of support layer 318B).

Continuous display 306 may include barrier layer 316B. Barrier layer 316 may correspond to the region of support layer 318B that includes a mesh (e.g., first folding region 312B). Barrier layer 316B may provide protection against dust and water ingress into continuous display 306 via the mesh of support layer 318B. Barrier layer 316B may be adhered to support layer 318B by one or more types of adhesives.

Continuous display 306 may include adhesive element layer 314B. Adhesive element layer 314B may be similar to adhesive element layer 214B and provide similar functionality. For example, adhesive element layer 314B may be disposed between barrier layer 316B and support layer 318B. and adhere barrier layer 316B to support layer 318B. Adhesive element layer 314B may include a plurality of adhesive elements such as adhesive elements 320B. Adhesive element layer 314B may include the plurality of adhesive elements 320B arranged in one or more patterns such as an interlaced pattern.

Adhesive elements 320B may include a plurality of adhesive elements. Adhesive elements 320B may be similar to adhesive elements 220B and adhesive elements 220A as illustrated in FIGS. 2A and 2B, respectively. For example, adhesive elements 320B may be rectangular in shape and arranged in an interlaced grid pattern.

Adhesive elements 320B may enable the exchange of air between the interior of continuous display 306 and the exterior of continuous display 306, as well as within the interior of continuous display 306. Airflows 330B represent the movement of air within continuous display 306. For example, the arrows of airflows 330B represent potential directions of air movement and exchange within continuous display 306 and with an exterior of continuous display 306. Airflows 330B may represent one or more paths defined by adhesive elements 320B that allow for the movement of air and/or the equalization of air pressure between the interior and exterior of continuous display 306.

Adhesive elements 320B may enable airflows 330B during a curing process of continuous display 306. During a curing process, continuous display 306 may be placed under increased heat and pressure (e.g., as represented by assembly arrows 340B) that results in a pressure differential between the exterior of continuous display 306 and an interior of continuous display 306. Adhesive elements 320B, by way of the spaces between themselves, may enable airflows 330B and the equalization of air pressure between the interior of continuous display 306 and the exterior of continuous display 306. In an example, a curing machine raises the air pressure of the environment of the curing machine from ambient air pressure to 0.6 MPa (~87 psi). Adhesive elements 320B enable air to enter from the exterior continuous display 306 and flow throughout adhesive element layer 314B, support layer 318B, and other layers of continuous display 306 (e.g., along airflows 330B). Adhesive elements enable the equalization of air pressure between the environment of the curing machine and the interior of continuous display 306.

FIG. 4 is a flow chart illustrating a method of assembling a folding device, in accordance with one or more aspects of this disclosure. For the purposes of clarity, FIG. 4 is described in the context of FIG. 3B.

An assembler applies an adhesive layer, such as adhesive element layer 314B, to a support layer, such as support layer 318B, underlying a display layer, such as display layer 324B of a foldable display comprising a continuous display, such as continuous display 306, that includes a flexible segment configured to fold, such as first folding region 312B, where at least a portion of adhesive element layer 314B includes a plurality of adhesive elements, such as adhesive elements 320B, arranged in a grid having space there between (400). The assembler may apply adhesive element layer 314B to support layer 318B via one or more devices such as a roller. For example, the assembler may "roll" a roller that includes a sheet of adhesive elements 320B onto support layer 318B. Adhesive elements 320B may be arranged in one or more patterns such as an interlaced pattern, with space between each adhesive element.

The assembler attaches a barrier layer, such as barrier layer 316B, to adhesive element layer 314B (402). Barrier layer 316B may be a layer of material such as glass, plastic, or other type of material. The shape of barrier layer 316B may correspond to a flexible region of support layer 316B such as first folding region 312B. For example, barrier layer 316B may be a sheet of TPU that covers the area of support layer 316B corresponding to first folding region 312B (e.g., providing a barrier between a mesh of support layer 316B and the exterior of continuous display 306.

The assembler may cure adhesive element layer 314B to adhere barrier layer 316B to support layer 318B (404). The assembler may cure adhesive element layer 314B through application of heat and pressure to continuous display 306. For example, the assembler may use an autoclave to apply increased pressure and/or heat to continuous display 306 and cause the adhesive elements of adhesive element layer 314B to cure. During a curing process, adhesive elements 320B of adhesive element layer 314B may enable the internal air pressure of continuous display 306 to equalize with the external air pressure. Due to the space between adhesive elements 320B, adhesive elements 320B and, by extension, adhesive element layer 314B, enable the movement of air within continuous display 306 and the exchange of air between the interior of continuous display 306 and the exterior of continuous display 306. In an example, an autoclave increases the air pressure exterior to continuous display 306 to 0.3 MPa (43.5 psi) above ambient atmospheric pressure. Adhesive elements 320B of adhesive element layer 314B enable the exchange of air between the interior and exterior of continuous display 306 and, therefore, enable the interior of continuous display 306 to equalize to an air pressure of 0.3 MPa (43.5) rather than remain at ambient atmospheric pressure and potentially deform due to the pressure differential.

Various aspects have been described in this disclosure. These and other aspects are within the scope of the following claims.

The invention claimed is:

1. A foldable display, comprising:
a continuous display that includes a flexible segment configured to fold, wherein the continuous display comprises:
a display layer comprising an optical display;
a support layer underlying the display layer;
a barrier layer underlying the support layer; and
an adhesive layer adhering the barrier layer to the support layer, wherein at least a portion of the adhesive layer includes a plurality of adhesive elements arranged in a grid having spaces there between.

2. The foldable display of claim 1, wherein the plurality of adhesive elements are arranged in an interlaced pattern.

3. The foldable display of claim 1, wherein each adhesive element of the plurality of adhesive elements is spaced between 0.05 millimeters and 0.2 millimeters from another adhesive element of the plurality of adhesive elements.

4. The foldable display of claim 1, wherein each adhesive element of the plurality of adhesive elements is rectangularly shaped.

5. The foldable display of claim 1, wherein each adhesive element is between 0.7 millimeters and 1.2 millimeters in width along a direction perpendicular to a planar surface of the foldable display in an unfolded state.

6. The foldable display of claim 1, wherein, when cured, the adhesive layer adheres the barrier layer to the support layer.

7. The foldable display of claim 6, wherein the plurality of adhesive elements define a path that allows for air pressure to equalize between the foldable display and an exterior of the foldable display during curing of the adhesive layer.

8. The foldable display of claim 1, wherein the barrier layer prevents at least one of dust intrusion or water intrusion into the foldable display.

9. A method, comprising:
applying an adhesive layer to a support layer underlying a display layer of a foldable display comprising a continuous display that includes a flexible segment configured to fold, wherein at least a portion of the adhesive layer includes a plurality of adhesive elements arranged in a grid having space there between;

attaching a barrier layer to the adhesive layer; and curing the adhesive layer to adhere the barrier layer to the support layer.

10. The method of claim 9, wherein applying the adhesive layer to the support further comprises applying the adhesive layer using a roller.

11. The method of claim 9, wherein applying the adhesive layer includes applying the plurality of adhesive elements in an interlaced pattern.

12. The method of claim 9, wherein each adhesive element of the plurality of adhesive elements is spaced between 0.05 millimeters and 0.2 millimeters from another adhesive element of the plurality of adhesive elements.

13. The method of claim 9, wherein each adhesive element of the plurality of adhesive elements is rectangularly shaped.

14. The method of claim 9, wherein each adhesive element is between 0.7 millimeters and 1.2 millimeters in width along a direction perpendicular to a planar surface of the foldable display in an unfolded state.

15. The method of claim 9, wherein curing the adhesive layer comprises:

curing the adhesive layer using an autoclave.

16. The method of claim 9, wherein the plurality of adhesive elements define a path that allows for air pressure to equalize between the foldable display and an exterior of the foldable display during the curing of the adhesive layer.

17. The method of claim 9, wherein the barrier layer prevents at least one of dust intrusion or water intrusion into the foldable display.

18. A kit for adhering a barrier layer to a support layer of a foldable display, the kit comprising:

a display layer comprising an optical display;

the support layer underlying the display layer;

the barrier layer underlying the support layer; and an adhesive layer adhering the barrier layer to the support layer, wherein at least a portion of the adhesive layer includes a plurality of adhesive elements arranged in a grid having spaces there between.

19. The kit of claim 18, wherein the plurality of adhesive elements are arranged in an interlaced pattern.

* * * * *